United States Patent
Haimerl et al.

(10) Patent No.: US 7,008,058 B2
(45) Date of Patent: Mar. 7, 2006

(54) PROGRESSIVE SPECTACLE LENS HAVING TWO ASPHERICAL PROGRESSIVE SURFACES

(75) Inventors: Walter Haimerl, Munich (DE); Herbert Pfeiffer, Munich (DE); Gregor Esser, Munich (DE); Helmut Altheimer, Lauchdorf (DE)

(73) Assignee: Rodenstock GmbH, Munich (DE)

( * ) Notice: Subject to any disclaimer, the term of this patent is extended or adjusted under 35 U.S.C. 154(b) by 0 days.

(21) Appl. No.: 10/938,852

(22) Filed: Sep. 13, 2004

(65) Prior Publication Data

US 2005/0110945 A1 May 26, 2005

Related U.S. Application Data

(63) Continuation of application No. PCT/DE03/00825, filed on Mar. 13, 2003.

(30) Foreign Application Priority Data

Mar. 13, 2002 (DE) ............................... 102 11 033

(51) Int. Cl.
*G02C 7/06* (2006.01)
(52) U.S. Cl. ..................... 351/168; 351/164; 351/169
(58) Field of Classification Search ................ 351/159, 351/164, 168, 169, 177–78, 161
See application file for complete search history.

(56) References Cited

U.S. PATENT DOCUMENTS

| | | | |
|---|---|---|---|
| 4,504,128 A | 3/1985 | Guilino et al. ............... 351/167 |
| 5,148,205 A * | 9/1992 | Guilino et al. ............... 351/159 |
| 5,771,089 A | 6/1998 | Barth ......................... 351/169 |
| 5,992,998 A | 11/1999 | Pfeiffer et al. .............. 351/169 |
| 6,199,984 B1 | 3/2001 | Menezes ..................... 351/169 |
| 6,655,802 B1 | 12/2003 | Zimmermann et al. ...... 351/169 |
| 6,669,337 B1 | 12/2003 | Welk et al. .................. 351/169 |
| 6,685,316 B1 | 2/2004 | Baumbach et al. .......... 351/169 |
| 6,698,884 B1 * | 3/2004 | Perrott et al. ................ 351/169 |
| 2003/0048410 A1 | 3/2003 | Baumbach et al. ......... 351/177 |
| 2003/0117578 A1 | 6/2003 | Haimerl et al. ............. 351/177 |
| 2003/0160940 A1 | 8/2003 | Welk et al. .................. 351/159 |
| 2004/0017543 A1 | 1/2004 | Welk et al. .................. 351/168 |

FOREIGN PATENT DOCUMENTS

| | | |
|---|---|---|
| DE | 3331757 | 5/1985 |
| DE | 3331763 | 5/1985 |
| DE | 4210008 | 9/1993 |
| DE | 4337369 | 5/1995 |
| DE | 10020576 | 11/2001 |
| WO | WO 01/57584 | 8/2001 |

* cited by examiner

*Primary Examiner*—Jordan N. Schwartz
*Assistant Examiner*—Jessica Stultz
(74) *Attorney, Agent, or Firm*—Crowell & Moring LLP

(57) ABSTRACT

A progressive spectacle lens having two aspherical and in particular progressive surfaces, i.e. surfaces contributing to the rise in the effect (addition Add.) from the distance vision portion to the near vision portion, in which the sagittal heights $$z_i = z_i(x,y)$$

of at least one (i) progressive surface (i=1,2) are chosen such that the sagittal height z of this respective surface at the edge of the spectacle lens given by $$y_i = f_{i1}(x) \text{ for } y \geq 0 \text{ and}$$

$$y_i = f_{i2}(x) \text{ for } y < 0$$

assume predefined values without this surface (i) or the other surface (j) having a reversal of curvature forming a supporting edge.

30 Claims, No Drawings

PROGRESSIVE SPECTACLE LENS HAVING TWO ASPHERICAL PROGRESSIVE SURFACES

CROSS REFERENCE TO RELATED APPLICATIONS

This application is a continuation of international patent application no. PCT/DE03/00825, filed Mar. 13, 2003, designating the United States of America, and published in German as WO 03/079095, the entire disclosure of which is incorporated herein by reference. Priority is claimed based on Federal Republic of Germany patent application no. DE 102 11 033.6 filed Mar. 13, 2002.

BACKGROUND OF THE INVENTION

The present invention relates to a progressive spectacle lens having two aspherical and in particular progressive surfaces.

Progressive spectacle lenses (also referred to as smooth-transition lenses, multifocal lenses etc.) are normally understood to mean spectacle lenses which, in the region through which the spectacle wearer views an object located at a greater distance—hereinafter referred to as the distance portion or distance vision portion—have a different (lower) refractive power than in the region (near vision portion) through which the spectacle wearer views a near object. Between the distance vision portion and the near vision portion, is what is known as the progression zone, in which the effect of the spectacle lens rises continuously from the action of the distance portion to that of the near portion. The value of the rise in the effect (in diopter) between what is known as the distance reference point and what is known as the near reference point is also designated the addition (Add.). Typical values of the addition lie between about 0.75 diopter and about 3.5 diopter.

As a rule, the distance vison portion is arranged in the upper part of the spectacle lens and designed for the view "to infinity", while the near vision portion is arranged in the lower region and is designed in particular for reading (distances of 0.33 to 0.4 m). For special applications—for example, pilot spectacles or spectacles for video display workstations—the distance and/or the near vision portion can also be arranged in another way and/or designed for different distances. Furthermore, it is possible for there to be a plurality of near vision portions and/or distance vision portions and correspondingly a plurality of progression zones.

In progressive spectacle lenses having a constant refractive index, in order to achieve an increase in the refractive power between the distance vison portion and the near vision portion, it is necessary for the curvature of one or both lens surfaces to change continuously from the distance portion to the near portion. This means that the surface(s) must be capable of being differentiated continuously at least twice.

The surfaces of spectacle lenses are normally characterized by what are known as the main radii of curvature $R1$ and $R2$ at each point on the surface. (Sometimes, instead of the main radii of curvature, what are known as the main curvatures $K1=1/R1$ and $K2=1/R2$ are also specified.) The main radii of curvature, together with the refractive index $n$ of the spectacle lens material at each point of the surface, determine the variables frequently used for the ophthalmic characterization of a surface:

Surface optical power=$0.5*(n-1)*(1/R1+1/R2)$

Surface astigmatism=$(n-1)*(1/R1-1/R2)$

The surface optical power is the variable via which the increase in the effect from the distance portion to the near portion is achieved. The surface astigmatism (clearly a cylinder effect) is a "disruptive property", since an astigmatism—if the eye does not itself have an astigmatism to be corrected—which exceeds a value of about 0.5 diopter leads to an image which is perceived as unsharp on the retina.

The change in the curvature of the surface required in order to achieve the increase in the surface optical power, without seeing "disruptive" surface astigmatism can certainly be achieved relatively simply along a (straight or curved) line, but beside this line the result is severe "mixing" of the surface, which leads to high surface astigmatism, which makes the lens worse to a greater or lesser extent in the regions beside the aforementioned line.

For reasons based on surface theory, it is therefore not possible, in a surface whose surface optical power increases from distance portion to near portion, to "keep" the regions beside an (astigmatism-free or afflicted with a predefined astigmatism) line free of physiologically disturbing surface astigmatism. For this purpose, reference is also made to what is known as the Minkwitz formulation.

Since, in the distance portion, the optical effect and therefore the main radii of curvature should not change (practically), it is relatively simple to configure the distance portion of a progressive surface in such a way that the distance portion exhibits a very small surface astigmatism (<0.5 diopter) or even the surface astigmatism value "0" in a large region, that is to say is configured spherically. On the other hand, the "quality" of the configurations of the lateral regions of the transition region is of critical importance for the tolerability of the spectacle lens for the respective spectacle wearer.

The fundamental task in the design of each progressive spectacle lens is therefore, without unreasonable impairment of the distance portion or its size, to configure the side regions in the transition zone and, optionally the side regions of the near portion, in such a way that the spectacle lens is as compatible as possible for the spectacle wearer and in particular for a young presbyope who is using a progressive spectacle lens for the first time.

In the past in order to achieve this fundamental task in the design of a surface of a progressive spectacle lens contributing to a change in the refractive power, the starting point has been a line lying in a plane or a curved line—referred to as the main meridian or the main line—as the "design backbone of the surface". This line or this construction backbone normally extends approximately centrally on the surface from top to bottom and, with its course, follows approximately the point at which the visual rays pierce the respective spectacle lens surface during a viewing movement and in particular when the eyes are lowered.

The main curvatures of each point on this line are chosen in such a way that the desired increase in the surface optical power from the distance portion to the near portion is achieved. Starting from this line, the side regions of the surface have then been calculated more or less suitably.

A large number of solutions have been disclosed for configuring the side regions. In the initial period of the calculation of progressive spectacle lenses, optimization of only the progressive surface based on pure surface theory was carried out, in which the most far-reaching reduction in the disruptive surface astigmatism or "pushing off" of the surface astigmatism into the lower lateral regions of the spectacle lens lay in the foreground.

For some years, most large manufacturers of progressive spectacle lenses have not optimized the progressive surface from points of view based on pure surface theory, but instead based on what is known as the position of use, that is to say in particular taking account of the astigmatism of oblique beams, so that not only the surface astigmatism but also the total astigmatism is viewed as one relevant variable to be optimized.

In order to calculate a progressive surface in the position of use, a situation of use is defined. This relates either to an actual user, for whom the individual parameters—such as pupil spacing, forward inclination, cornea vertex spacing and so on—are determined specifically in the respective situation of use, and the progressive surface is calculated and produced separately, or to average values, such as are described, for example, in DIN 58 208, Part 2. Information regarding the calculation of the lens surface, particularly in relation to the parameters to be taken into account, is described in U.S. Pat. No. 6,685,316 (=WO 01/57584) the entire disclosure of which is incorporated herein by reference.

Irrespective of whether, in a progressive spectacle lens with only one progressive surface, this surface has been optimized only from points of view of surface theory or for an actual position of use, the result is that only one surface contributes to the increase in the refractive power, there are restrictions with regard to the properties of the optimized surface and therefore of the entire spectacle lens.

Therefore, for a long time, at least in the patent literature, spectacle lenses with two progressive surfaces have been proposed. Examples of known spectacle lenses with two progressive surfaces are described, inter alia, in published German patent application nos. DE 33 31 757 A1 and DE 33 31 763 A1.

The use of two progressive surfaces, that is to say surfaces which contribute to the rise in the optical effect from the distance portion to the near portion, has in any case the advantage that each of the surfaces has to provide only a part of the addition. Since the image errors of a surface, such as the surface astigmatism or the distortion, increase at a greater than linear rate with the increase in the addition Add. in the usual surface designs, better optical properties already result from dividing up the addition to two surfaces, as compared with a progressive lens with the same distance portion effect and the same addition which has only one progressive surface and whose other surface is a spherical or toric surface.

This statement also applies when the other surface is an aspherical or atoric surface which has been calculated individually in order to adapt a progressive surface which has been optimized for an average situation of use to a specific situation of use which differs from the design situation of use.

In addition, the surface astigmatism values of the eye-side surface and the front surface add up geometrically or in accordance with the crossed cylinder method, that is to say not in terms of magnitude but taking account their axial position. Since, in addition, in the case of the front surface and the eye-side surface, which have been optimized successively or simultaneously while taking account of the already optimized or the respective other surface, the maximum values of the surface astigmatism generally lie at points which are not "pierced" by one and the same visual ray and, in addition, the axial positions of the surface astigmatism are likewise generally different, the (geometrically) added surface astigmatism values of the progressive front surface and of the progressive eye-side surface do not attain the surface astigmatism values of a spectacle lens with only one progressive surface. In addition, it is even possible to configure the surfaces in such a way that the image errors, such as the undesired surface astigmatism values of the two surfaces, at least partly compensate each other. See, for example, the two published German patent applications cited above.

In prior art progressive spectacle lenses having two progressive surfaces, the two surfaces have been calculated only from the point of view of improving the optical properties as compared with progressive spectacle lenses having only one progressive surface.

Optimization of the two progressive surfaces from other points of view, such as in particular geometric points of view, such as, for example, the course of the edge of the front surface of a bordered spectacle lens that is adapted to a lens ring of a spectacle frame, has not been considered in the past. Even the reduction in the mixing mentioned in the aforementioned published German patent application no. DE 33 31 757 A1 is used merely to reduce the surface astigmatism and therefore to improve the optical properties and not to optimize a progressive spectacle lens having two progressive surfaces while taking into account geometric and, in particular, cosmetic points of view.

SUMMARY OF THE INVENTION

It is an object of the invention to provide an improved spectacle lens with two aspherical, progressive surfaces.

Another object of the invention is to provide a progressive spectacle lens which exhibits good optical properties and satisfies specific predefinitions with regard to its external shaping.

A particular object is to provide a spectacle lens which exhibits good optical properties and additionally satisfies cosmetic preconditions such as deflection of the spectacle lens or the course of the spectacle lens edge.

These and other objects are achieved in accordance with the present invention by providing a progressive spectacle lens having two aspherical, progressive surfaces which contribute to a rise in the effect (addition Add.) from a distance view portion to a near view portion, wherein the sagittal heights $$z_i = z_i(x, y)$$

of at least one (i) progressive surface (i=1,2) are chosen such that the sagittal heights z of this respective surface at the edge of the spectacle lens given by $$y_i = f_{i1}(x) \text{ for } y \geq 0 \text{ and}$$

$$y_i = f_{i2}(x) \text{ for } y < 0$$

assume predefined values without this surface (i) or the other surface (j) having a reversal of curvature serving to form a supporting edge.

In accordance with a further aspect of the invention, the objects are also achieved by providing a method of calculating a progressive spectacle lens as described above comprising selecting initial conditions for a double strip on both sides of the main lines of the front surface and the eye-side surface such that when the lens has a surface configuration which satisfies a predefined target function, the predefined courses of the sagittal heights z of the edges of the surfaces are obtained.

In yet another aspect of the invention, the objects are achieved by providing a progressive spectacle lens having two progressive surfaces contributing to a rise in effect Add. from a distance portion to a near portion, wherein the effect rises along a main line from the distance portion to the near portion, and the main line is formed as a curve which curves toward a side of a wearer's nose, and wherein the main line curve between the distance portion and the near portion is offset differently on the front surface than on the eye-side surface of the lens.

Objects of the invention are also achieved by providing a method of calculating a progressive spectacle lens as described in the preceding paragraph comprising defining a target function, and selecting initial conditions for a double strip on both sides of the main lines of the front surface and the eye-side surface such that when the lens has a surface configuration which satisfies the target function, the predefined courses of the sagittal heights z of the edges of the surfaces are obtained.

Additional advantageous preferred aspects and embodiments of the invention are described in more detail hereinafter.

According to one aspect of the invention, the sagittal heights $$z_i = z_i(x, y)$$

of at least one (i) progressive surface (i=1,2) are chosen such that the sagittal heights z of this surface at the edge of the spectacle lens given by $$y_i = f_{i1}(x) \text{ for } y \geq 0 \text{ and}$$

$$y_i = f_{i2}(x) \text{ for } y < 0$$

assume predefined values without this surface (i) or the other surface (j) having a reversal of curvature serving to form a supporting edge, etc.

A supporting edge is used, for example, in the case of cataract spectacles, in order to be able to slip the spectacle lens into a comparatively large spectacle frame with a central thickness which is not too great.

In particular, in this case it is possible to predefine not only the course of the edge but even the configuration of the peripheral region of one or both surfaces in a largely free manner, for example from cosmetic points of view.

The sagittal height, according to the conventional definition in spectacle optics within the context of the present application, is the distance of a point having the coordinates (x,y) on one of the two surfaces of the spectacle lens from the tangential plane to the vertex of the front surface in the direction of the surface normal (z axis) of the tangential plane. In this case, the origin of the x,y,z coordinate system is located at the vertex of the front surface, and as a rule, but not necessarily, coincides with the center of the raw round spectacle lens. The x axis runs horizontally in the position of use, that is to say in the case of a spectacle lens arranged in front of the eye of the spectacle wearer, the y axis vertically.

According to the invention, it has been recognized that, in the case of a progressive spectacle lens having two aspherical and in particular progressive surfaces, it is possible to predefine the course of the edge (and even of the peripheral region, serving only for orienting sight) of at least one surface in a largely free manner, it being possible for the edge region to be used for (direct and indirect) sight in the same way as in the case of a conventional progressive spectacle lens having only one progressive surface which has been optimized without any regard to the course of the edge. In particular, the edge region is therefore not configured as what is known as a supporting edge, such as is used for example in the case of spectacle lenses with high effect for spectacle wearers who have undergone a cataract operation. Spectacle lenses of this type are described, for example, in U.S. Pat. No. 4,504,128 (=DE 32 25 270), the entire disclosure of which is incorporated herein by reference, in particular relating to an explanation of the terms "reversal of curvature" and "supporting edge".

Primarily, however, in contrast to spectacle lenses having only one progressive surface, the predefinition of the course of the edge, determined substantially by geometric predefinitions, has virtually no effect on the optical properties of the spectacle lens in the central region, that is to say the critical region for direct immediate seeing. In the case of spectacle lenses having only one progressive surface, on the other hand, it is determined that the edge conditions for the periphery have a noticeable influence on the optimization of the central region.

Thus, in the case of the spectacle lens according to the invention, it is in particular possible that, as in the case of known progressive spectacle lenses having only one progressive surface, the total astigmatism at no point on the spectacle lens exceeds a value of 1.5*Add. and in particular 1.1*Add. or even 1.0*Add. As used herein, "total astigmatism" is understood to mean the astigmatism in the position of use, which is determined substantially by the surface astigmatism of the two surfaces and the astigmatism of oblique beams. In spectacle lenses with little optical effect, the total astigmatism is determined substantially by the surface astigmatism of the two surfaces.

This compliance with conditions for the total astigmatism must in particular not be at the expense of other optical properties, such as the distortion and/or the refraction error. In particular, it is possible that the refraction error at no point on the spectacle lens exceeds a value of 1*Add. and in particular of 0.7*Add. Furthermore, specific definitions for the prismatic effects at specific points on the spectacle lens can also be made. In practice, even still substantially lower values for the total astigmatism and the refraction error are possible.

In the predefinition according to the invention of the course of the edge, an extremely wide range of points of view can be taken into account. In particular, the edge can be the edge of the bordered spectacle lens predefined by a selected spectacle frame. This means that, even in the case of spectacle frames having extreme configurations, the (individually calculated) edge course can, for example, be formed in such a way that the edge of the front surface does not "protrude" at any point beyond what is known as the lens ring of the spectacle frames.

Of course, however, it is not just possible to predefine the edge course while taking into account the cause of the lens rings of the spectacle frames into which the progressive spectacle lenses are to be inserted. In particular when the two progressive surfaces have not been calculated for an individual situation of use, but for an average situation of use, that is to say have not been calculated individually, it is advantageous if the edge course for the raw round spectacle lens is predefined.

Alternatively or additionally, the edge course or the configuration of the peripheral region of one or both surfaces can also be predefined in such a way that the critical thickness of the spectacle lens, the central thickness in the case of spectacle lenses with a positive effect or the edge thickness in the case of spectacle lenses with a negative effect, is minimized.

Furthermore, it is possible to select the courses of the edges of the two surfaces in such a way that the variation in the edge thickness along the periphery of the spectacle lens is considerably lower than in the case of a progressive spectacle lens having only one aspheric-progressive surface. The reduction in the edge thickness can in this case be balanced with an improvement in the optical properties as compared with a spectacle lens having only one progressive surface.

In particular, in the case of a balanced configuration, it is possible for the variation in the edge thickness along the peripheral edge to be at least 30% lower than in the case of a progressive spectacle lens having the same distance portion effect and addition and having only one progressive surface. Expressed in absolute terms, the edge thickness along the periphery of a raw round spectacle lens can vary by less than 40% and in particular by less than 25%.

The spectacle lens according to the invention can in this case otherwise be formed in a way similar to conventional progressive spectacle lenses and, in particular, to spectacle lenses having only one progressive surface calculated individually for a specific patient or a specific position of use.

For instance, in the case of an astigmatic prescription it is possible for at least one of the two surfaces to have a surface astigmatism whose magnitude and axial position at least approximately correct the astigmatism of the eye, if appropriate while taking account of the astigmatism of oblique beams.

Nevertheless, the spectacle lens according to the invention has a large number of possible configurations which are not described in the published patent literature or are not implemented in the known progressive spectacle lenses having two progressive surfaces.

One possible configuration, not recognized in the prior art, in the case of spectacle lenses having two progressive surfaces is the division of the addition between the front surface and the eye-side surface. This means, firstly, that the front surface and the eye-side surface do not have to contribute the same amount to the increase in the effect of the distance portion (distance reference point) to the near portion (near reference point). Secondly, this means that the rise in the effect on the front surface and the eye-side surface can be locally different, that is to say along and/or perpendicular to the (respective) main line. For example, the rise in the effect Add. predefined by the respective prescription from the distance portion to the near portion (addition) can be divided up between the front surface (i=1) and the eye-side surface (i=2) in such a way that the sagittal heights $z_i$ of the at least one surface (i) have the predefined values.

In addition, however, it is also possible for the rise in the effect in the progression zone beginning from the distance reference point to be produced initially (substantially) by the change in curvature of one surface and, in the lower part of the progression zone, (substantially) by the change in curvature of the other surface. Expressed in other words, the gradient of the rise in the effect on the front surface and the eye-side surface in the progression zone is locally different along the main lines. This results in completely new possible configurations of the periphery of the spectacle lenses according to the invention.

Furthermore, it is possible that not only the course of the progression rise along the main line but also the length of the progression zone on the front surface and the eye-side surface is different.

A further possibility, which can also be used independently of other aspects of the invention, is that, depending on the axial position and/or the magnitude of the astigmatism and, in particular in the event of different amounts of astigmatism and/or axial positions in the distance and the near, that is a say in the distance and near portion, one surface (i) at least substantially applies the astigmatic prescription in the distance portion and the other surface (j) at least substantially applies the astigmatic prescription in the near portion.

For instance, in a specific axial position, first of all the surface astigmatism in the distance portion of the front surface can produce the astigmatism which at least partially compensates for the astigmatism of the eye. In the progression zone, the surface astigmatism of the front surface necessary for the compensation then decreases continuously, while the surface astigmatism on the eye-side surface increases continuously. In the near vision portion, the surface astigmatism of the eye-side surface then contributes virtually exclusively to the compensation of the astigmatism of the eye. Of course, an extremely wide range of "transition forms" or "mixed forms" or the converse configuration is possible.

Furthermore, it is possible for the distance portion and the near vison portion to have a different extent on the front surface and the eye-side surface:

The limits of the distance portion and of the near portion are normally given by an ISO surface astigmatism line having a specific absolute value. These lines can then have a different course on the front surface and on the eye-side surface of the lens. In a lens with an astigmatism-free prescription, the ISO astigmatism line limiting the distance portion or the near portion is usually the 0.5 diopter line of the surface astigmatism. Of course, however, other definitions for the limit of the distance portion and of the near portion are also possible.

As already stated, the spectacle lens according to the invention is formed in a conventional way in specific parts. Thus, it is in particular possible for the effect from the distance portion to the near portion to rise in a known manner along a curve (main line) curved toward the side of the nose. The main lines can have different courses on the front surface and the eye-side surface. This is firstly necessary because of the prismatic deflections of the visual ray in the spectacle lens. However, the difference in the course of the main lines can also be greater or smaller than necessary to compensate for the prismatic deflections and, in this way, represent a further configuration possibility.

Therefore, in the spectacle lens according to the invention, the offset of the main lines between the distance vison portion and the near vision portion on the front surface and the eye-side surface is frequently different. In addition, the offset can be a function of the addition and/or the effect.

The main line on the front surface and the eye-side surface does not in particular have to be the center between two ISO astigmatism lines. Thus, it is possible that, on the main lines, the surface astigmatism in the case of an astigmatism-free prescription has a minimum and, in the case of an astigmatic prescription, has the greatest approach to the value of the astigmatic prescription in the central region of the spectacle lens. Alternatively, it is also possible that, in particular in the case of an astigmatic prescription, the surface astigmatism changes at least approximately linearly perpendicular to the main line in a strip on both sides of the main line.

The spectacle lens according to the invention can be calculated in a known manner by taking into account the above technical teaching, so that it is possible to dispense with the description of an actual exemplary embodiment. In particular, it is possible for a target function to be predefined in a known manner in order to calculate a spectacle lens according to the invention. In this case, the initial conditions for the double strip on both sides of the main lines of the front surface and the eye-side surface are selected suitably in such a way that, in the case of a surface configuration which satisfies the predefined target function, the predefined course of the sagittal height(s) z of the edge of the surface(s) is obtained.

For example, the following target function F, with which not only a value of the surface astigmatism but also the axial position of the surface astigmatism along the main line, and the value of the surface refractive power can be predefined, can be used:

$$F = \int_{y_{min}}^{y_{max}} [(A-A_v)^2 + (D-D_v)^2 + (\varepsilon - \varepsilon_v^2)] dy$$

where $A_v(y)$, $D_v(y)$ and $\varepsilon_v(y)$ are the respectively predefined surface properties along the main line, and A(y) is the surface astigmatism, D(y) is the surface optical power, and $\varepsilon(y)$ is the axial position of the surface astigmatism with respect to the horizontal plane.

By minimizing this target function, the main line and the region surrounding it (double strip) can be obtained from physiological points of view following predefinition of the projection $f_1(y)$ of the main line onto the x,y plane. In the process, prisms which are also required or predefined for stylistic reasons can also be taken into account. See also U.S. Pat. No. 5,992,998 (=DE 43 37 369), the entire disclosure of which is incorporated herein by reference.

In particular, it is possible in this case that, in the case of a surface configuration which satisfies the predefined target function, the result is a variation in the edge thickness which is considerably lower than that in a progressive spectacle lens having only one progressive surface. The predefined target function corresponds to that of a progressive spectacle lens having only one progressive surface which is optimized without taking into account the course of the edge.

In any case, a spectacle lens having two progressive surfaces is obtained, in which the peripheral edge region is configured not only from optical points of view but also from geometric and in particular cosmetic points of view, without the tolerability of the spectacle lens suffering.

In addition or as an alternative, other predefinitions with regard to the course of the surface can also be met, which are made from "non-optical" points of view, for example cosmetic points of view, such as deflection of the spectacle lens in one or two mutually perpendicular directions, critical thickness, etc., without the tolerability of the spectacle lens suffering.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variation within the scope of the appended claims and equivalents thereof.

What is claimed is:

1. A progressive spectacle lens having two progressive surfaces contributing to a rise in effect Add. from a distance portion to a near portion, wherein the effect rises along a main line from the distance portion to the near portion, and the main line is formed as a curve which curves toward a side of a wearer's nose, and wherein the main line curve between the distance portion and the near portion is offset differently on the front surface than on the eye-side surface of the lens.

2. A progressive spectacle lens according to claim 1, wherein the sagittal heights $$z_i = z_i(x,y)$$

of at least one (i) of the progressive surfaces (i=1,2) are chosen such that the sagittal height z of this respective surface at the edge of the spectacle lens given by $$y_i = f_{i1}(x) \text{ for } y \geq 0 \text{ and}$$

$$y_i = f_{i2}(x) \text{ for } y < 0$$

assume predefined values without this surface (i) or the other surface (j) having a reversal of curvature which forms a supporting edge.

3. A spectacle lens according to claim 2, wherein at least one surface of the lens has a peripheral region which is configured in a substantially free manner from a cosmetic point of view.

4. A spectacle lens according to claim 2, wherein the lens front and eye-side surfaces at the edge of the lens have sagittal heights z with predefined values substantially determined by geometric predefinitions, and wherein, despite compliance with these predefinitions, the spectacle lens has optical properties which are not noticeably degraded either in the central region or in the edge region relative to an equivalent spectacle lens having one progressive surface in which the course of the edge is not predefined.

5. A spectacle lens according to claim 4, wherein the total astigmatism at any point on the spectacle lens does not exceed a value of 1.5*Add.

6. A spectacle lens according to claim 5, wherein the total astigmatism at any point on the spectacle lens does not exceed a value of 1.1*Add.

7. A spectacle lens according to claim 4, wherein no point on the spectacle lens has a refraction error exceeding a value of 1*Add.

8. A spectacle lens according to claim 7, wherein no point on the spectacle lens has a refraction error exceeding a value of 0.7*Add.

9. A spectacle lens according to claim 2, wherein the edge is the edge of the bordered spectacle lens predefined by an individually selected spectacle frame.

10. A spectacle lens according to claim 2, wherein the edge is the edge of a raw round spectacle lens.

11. A spectacle lens according to claim 1, wherein the rise in the effect Add. from the distance portion to the near portion predefined by the prescription of the lens is divided between the front surface (i=1) and the eye-side surface (i=2) such that the sagittal heights $z_i$ of the at least one surface (i) have predefined values.

12. A spectacle lens according to claim 2, wherein both of the surfaces are aspherical, and wherein the sagittal height $z_j$ of the other surface (j) at the edge is selected in such a way that the variation in the edge thickness along the periphery of the spectacle lens is lower than that of an equivalent progressive spectacle lens having only one aspheric-progressive surface.

13. The spectacle lens according to claim 12, wherein the peripheral edge of the lens has a variation in edge thickness at least 30% less than an equivalent progressive spectacle lens having the same distance portion effect and the same rise in the effect Add., and having only one progressive surface.

14. The spectacle lens according to claim 13, wherein the peripheral edge of the lens has a variation in edge thickness at least 50% less than an equivalent progressive spectacle lens having the same distance portion effect and the same rise in the effect Add., and having only one progressive surface.

15. A spectacle lens according to claim 12, wherein the lens in a raw round state has a peripheral edge thickness which varies by less than 40%.

16. A spectacle lens according to claim 15, wherein the lens in a raw round state has a peripheral edge thickness which varies by less than 25%.

17. A spectacle lens according to claim 1, wherein the lens has an astigmatic prescription, and at least one of the two surfaces has a surface astigmatism with a magnitude and axial position which at least substantially correct the astigmatism of the eye of a wearer.

18. A spectacle lens according to claim 17, wherein the surface astigmatism is selected such that the surface astigmatism at least substantially corrects the astigmatism of the eye while taking account of the astigmatism of oblique beams.

19. A spectacle lens according to claim 17, wherein one surface (i) at least substantially incorporates the astigmatic prescription in the distance portion, and the other surface (j) at least substantially incorporates the astigmatic prescription in the near portion.

20. A spectacle lens according to claim 19, wherein the distance portion and the near portion of the lens exhibit different amounts of astigmatism or different axial positions.

21. A spectacle lens according to claim 1, wherein the distance portion and the near portion have limits given by an ISO surface astigmatism line with a specific absolute value, and said limits have a different course on the front surface (i=1) and on the eye-side surface (i=2) of the lens.

22. A spectacle lens according to claim 21, wherein the lens has an astigmatism-free prescription, and the distance portion and the near vision portion are delimited by an ISO astigmatism line which is a 0.5 diopter line of the surface astigmatism.

23. A spectacle lens according to claim 1, wherein the lens is for an astigmatism-free prescription, and the surface astigmatism on the main lines has a minimum.

24. A spectacle lens according to claim 1, wherein the lens has an astigmatic prescription, and the surface astigmatism most closely approaches the value of the astigmatic prescription in the central region of the spectacle lens.

25. A spectacle lens according to claim 1, wherein the lens has an astigmatic prescription, and the surface astigmatism changes at least approximately linearly perpendicular to the main line in a strip on both sides of the main line.

26. A spectacle lens according to claim 1, wherein the length of the progression zone or the course of the progression rise along the main line is different on the front surface than on the eye-side surface of the lens.

27. A method of calculating a progressive spectacle lens according to claim 1, said method comprising defining a target function, and selecting initial conditions for a double strip on both sides of the main lines of the front surface and the eye-side surface such that when the lens has a surface configuration which satisfies the target function, the predefined courses of the sagittal heights z of the edges of the surfaces are obtained.

28. A method according to claim 27, wherein the lens has a surface configuration which satisfies the target function, and the lens has an edge thickness variation which is lower than the edge thickness variation of an equivalent progressive spectacle lens having only one progressive surface.

29. A method according to claim 27, wherein the target function corresponds to that of a progressive spectacle lens having only one progressive surface which is optimized without taking into account the course of the edge.

30. A method according to claim 27, wherein the surface configuration of the lens is optimized such that the lens has a critical thickness which is minimized.

* * * * *